DOUBLE COUNTER DEMODULATOR CIRCUIT

Filed Aug. 21, 1952 2 Sheets-Sheet 1

INVENTORS.
Julius J. Hupert
Andrzej B. Przedpelski
Kenneth Ringer
By: Moore, Olson & Trexler attys.

DOUBLE COUNTER DEMODULATOR CIRCUIT

Filed Aug. 21, 1952 2 Sheets-Sheet 2

INVENTORS
Julius J. Hupert
Andrzej B. Przedpelski
Kenneth Ringen
By: Moore, Olson & Trexler attys.

2,770,727

DOUBLE COUNTER DEMODULATOR CIRCUIT

Julius J. Hupert, Andrzej B. Przedpelski, and Kenneth Ringer, River Forest, Ill., assignors to A. R. F. Products, Inc., River Forest, Ill., a corporation of Illinois Application August 21, 1952, Serial No. 305,634

4 Claims. (Cl. 250—27)

This invention is concerned generally with demodulation, and particularly with the demodulation of frequency modulated radio waves.

An object of this invention is to provide an improved discriminator for the demodulation of frequency modulated signals and for automatic frequency control of oscillators.

Another object of this invention is to provide a discriminator having large peak separation which is independent of the input frequency.

A further object of this invention is to provide a discriminator of superior linearity which introduces a practical minimum of distortion in the demodulation of frequency modulated signals.

A more specific object of this invention is to provide a counter discriminator having no image responses.

Another object of this invention is to provide a discriminator for automatic frequency control without the necessity of a direct current reference voltage, thereby eliminating the necessity for reference voltage stabilizer circuits and leading to design simplification.

Yet another object of this invention is to provide an automatic frequency control circuit of superior stability and not subject to drifting with changes in temperature, supply voltage, or age.

Other and further objects and advantages of the present invention will be apparent from the following description when taken in connection with the accompanying drawings wherein.

In order to carry out the objects of our invention we propose to use a pair of counter demodulators in a unique circuit. Counter demodulators, also known as counter detectors or counter discriminators, are well known in the art and are used to generate a D. C. output voltage, the value of which is proportional to the frequency of an input signal and is independent of the amplitude or magnitude of the input signal. This independence is achieved by limiting or clipping the input signal.

Counter demodulators heretofore have been used for demodulating frequency modulated signals, hereinafter referred to for the sake of brevity as FM signals, and for providing correcting voltage for automatic frequency control. Modern radio receivers, etc. practically all are of the superheterodyne type, and conventional demodulators used for demodulating FM have been plagued with image responses, that is, the output is obtained with an input or signal frequency having a value a certain amount above the local or heterodyning oscillator, or by a signal the same amount below that of the local oscillator.

When counter demodulators are used conventionally for automatic frequency control, it is necessary to apply a reference D. C. voltage in opposition to the output voltage of the counter demodulator. This requires an extremely well controlled voltage supply which does not vary in output voltage with changes in input voltage, with changes in either ambient or operating temperatures, or with aging. Such extremely stable D. C. voltages are very nearly impossible to obtain and require additional, complicated circuits which are expensive to design and build.

Figure 1:
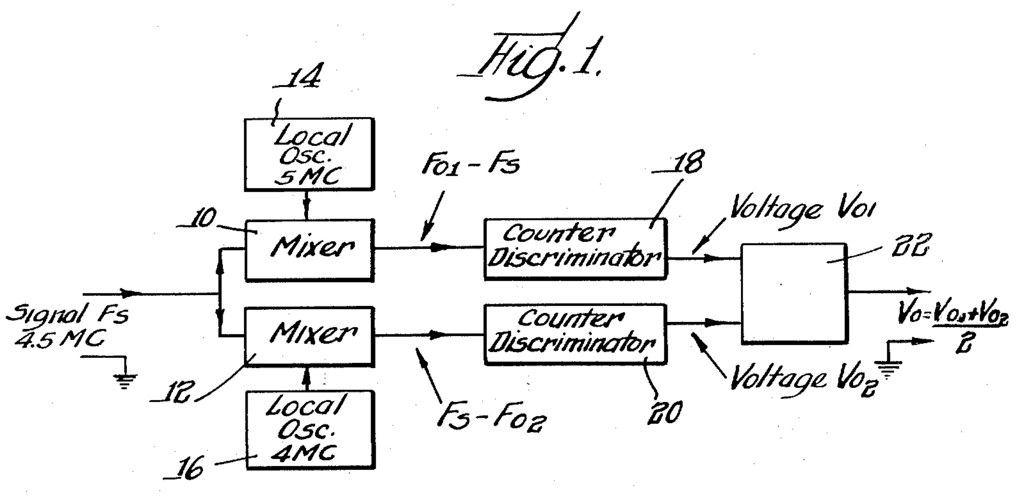
Fig. 1 is a block diagram of our improved demodulator or discriminator.

The essence of our invention by means of which the prior art difficulties have been overcome resides in the use of a double counter demodulator, that is two counter demodulators receiving the same signal and having a common, composite output. As shown generally in the block diagram of Fig. 1, an input signal of a predetermined frequency and indicated at $Fs$ is fed into a pair of similar mixers 10 and 12. Local oscillators 14 and 16 feed signals into the mixers 10 and 12 respectively. As a specific example, if the input signal $Fs$ has a value of 4.5 megacycles, then the local oscillator 14 might have an output frequency of 5 megacycles and the local oscillator 16 might have an output frequency of 4 megacycles. The resulting frequency of each mixer therefore is 0.5 megacycle. The oscillators may be crystal controlled, or free running, or free running and coupled mechanically, depending upon the use to which our counter demodulator circuit is to be put.

The outputs of the mixers 10 and 12 having frequencies indicated as $Fo1-Fs$, and $Fs-Fo2$, respectively are fed into a pair of similar counter discriminators 18 and 20 of conventional design. The output voltages of the counter discriminators are direct current voltages indicated at $Vo1$ and $Vo2$. The voltages $Vo1$ and $Vo2$ are arranged in series with one another and are combined by a network 22 to produce an output voltage $$Vo=\frac{Vo1+Vo2}{2}$$

it being understood that $Vo1$ and $Vo2$ are algebraic values of potentials of opposite signs with respect to ground.

If the input signal $Fs$ is a modulated signal, then the output of the mixers will increase and decrease in frequency at the same rate as the input signal $Fs$, the output of the first mixer 10 decreasing in frequency with increasing input signal frequency, and the output frequency of the mixer 12 increasing with increasing signal frequency. The discriminator output voltages $Vo1$ and $Vo2$, although D. C. voltages, will vary in magnitude with the variation in frequency applied to the discriminators 18 and 20, one of the voltages rising while the other drops. If the circuit is originally arranged so that $Vo1$ and $Vo2$ are equal in value with an unmodulated input signal, and such equality is the normal condition, then the output voltage $Vo$ can be either positive or negative at any given instance.

Figure 2:
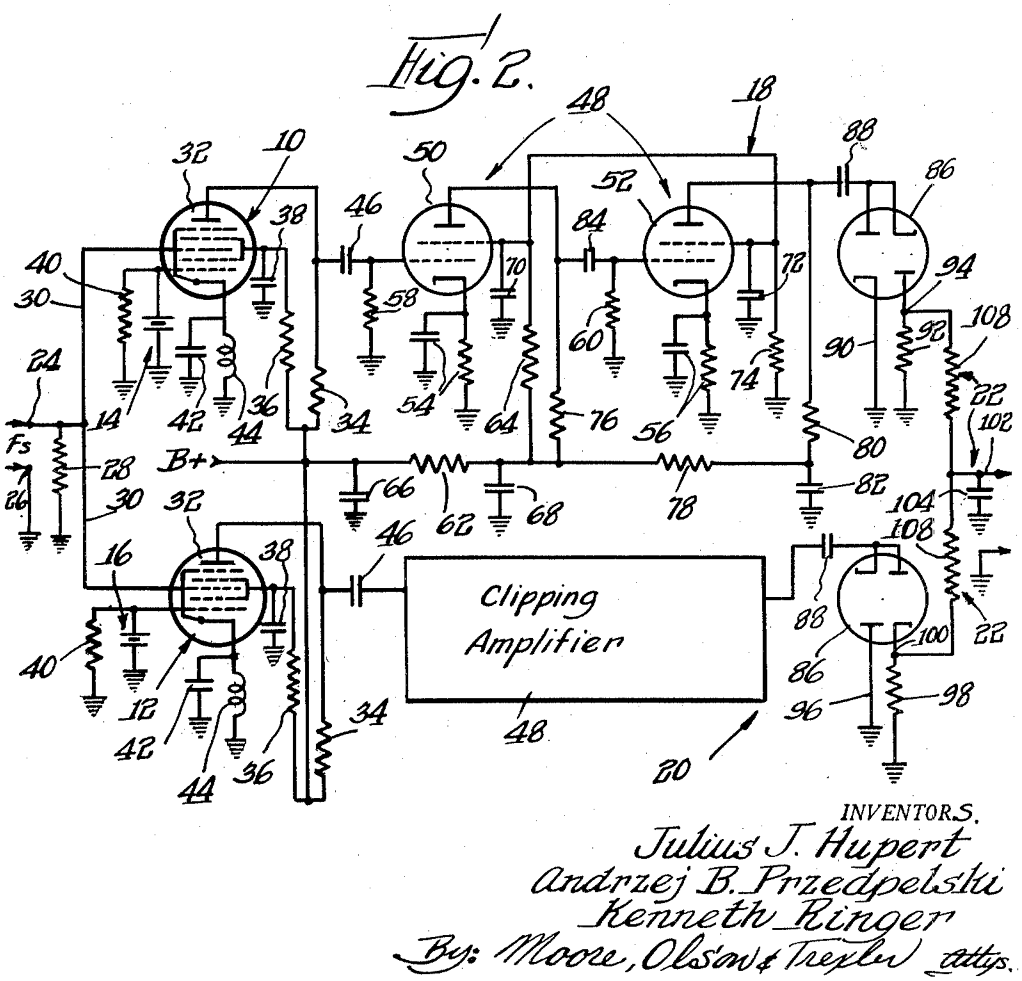
Fig. 2 is a wiring diagram of the demodulator.

For a practical circuit embodying the heretofore discussed principles, reference should be had to Fig. 2. The input signal $Fs$ is applied to terminals indicated at 24 and 26, the latter being grounded. A grid resistor 28 is connected between the terminal 24 and ground and similar wires 30 lead from the input terminal 24 to the third grids of a pair of conventional mixer tubes 32 comprising the mixers 10 and 12. The tubes 32 conveniently are of the 6BE6 type. The plates of the mixer tubes 32 are provided with B+ plate voltage through plate load resistors 34 and the second and fourth grids are supplied through resistors 36 having capacitors 38 connected to ground therefrom. The local oscillators 14 and 16 are indicated at Fig. 2 and the first grid of each tube 32 is biased by a grid leak resistor 40, the cathode of each tube being provided with parallel arranged capacitors 42 and inductors 44 connected to ground.

The outputs of the mixers 10 and 12 are fed through capacitors 46 to a pair of clipping amplifiers 48. One of the clipping amplifiers 48 is illustrated as a block diagram for simplicity of illustration. Both clipping amplifiers 48 are identical and include two amplifier tubes 50 and 52 which for sake of illustration may both be of the 6AH6 type. The cathodes of the tubes 50 and 52 are provided, respectively, with the usual capacitor-resistor biasing networks 54 and 56 while the control grids are provided with grid resistors 58 and 60. The screen grids of the tubes 50 and 52 are connected in parallel to the B+ supply through resistors 62 and 64, smoothing capacitors 66 and 68 being connected between opposite ends of the resistor 62 and ground. Capacitors 70 and 72 are connected from the screen grids of the tubes 50 and 52 to ground and a common resistor 74 grounds the two screen grids.

The plate of the tube 50 is supplied with power through a load resistor 76 from the junction between the resistors 62 and 64, and the plate of the tube 52 is supplied from the same point through a filter resistor 78 and a load resistor 80, a smoothing capacitor 82 being connected from the junction of the resistors 78 and 80 to ground.

The output of the first tube 50 is coupled by a capacitor 84 to the control grid of the tube 52 and the output of the tube 52 of each clipping amplifier 48 is coupled to a rectifier tube 86 by a capacitor 88. The tubes 86 are dual diodes which, for example, may be of the 6AL5 type. A plate and cathode of each tube 86 are tied together and connected to the corresponding capacitor 88. The first cathode of the tube 86 associated with the discriminator 18 is grounded as at 90 and the second plate is grounded through a resistor 92, the output being taken from a point 94 on the plate side of the resistor. The first plate of the other tube 86 is grounded at 96 while the second cathode is connected through a resistor 98 to ground, the output of this tube being taken from a point 100 on the cathode side of the resistor 98. The output points 94 and 100 are connected together through resistors 108 to the output terminal 102 which is grounded through a capacitor 104. The resistors 108 and capacitor 104 form an integrating circuit for converting short unidirectional pulses into D. C. output voltage as is well known in the art. The output voltages $Vo1$ and $Vo2$, which are the D. C. potentials at points 94 and 100 relative to ground, and can be either positive or negative relative to ground, but are always of opposite sign.

The clipping amplifiers 48 have the values of the various voltages and circuit elements chosen so that any input signal of usable magnitude is clipped. That is to say, the outputs of the clipping amplifiers are substantially square waves of constant amplitude which is independent of the magnitude of the incoming signal. The frequency of the outputs of the clipping amplifiers varies, however, with the variation in input frequency as set forth heretofore. The output of the rectifier tubes 86 also varies with this frequency variation, and with this only, due to the constant amplitude of the signals applied to the rectifier tubes.

Figure 3:
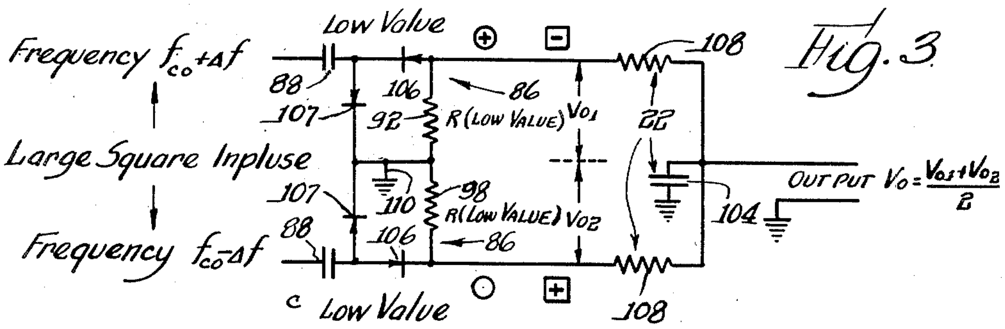
Fig. 3 is an equivalent circuit.

An equivalent circuit of the demodulators and combining networks is shown in Fig. 3. The beat frequencies from the mixers 10 and 12 with an unmodulated carrier or input signal are equal. The value of these equal beat frequencies has been indicated in Fig. 3 as *fco*, and this frequency plus or minus the instantaneous deviation of the input signal due to modulation as indicated at $\Delta f$ passes from the clipping amplifiers through the capacitors 88, indicated in Fig. 3 as being of low value, to the rectifiers 86. The right hand ones of the rectifiers 86 are shown diagrammatically in Fig. 3 as being simple unilaterally conducting devices 106 in series with the resistances 92 and 98 of low value and connected to ground at 110. The left hand ones of the rectifiers 106, indicated as 107 in Fig. 3, serve to conduct to ground currents of polarity opposite to that selected for rectifiers 106 without causing any voltage drop across resistors 92 and 98. The output voltages $Vo1$ and $Vo2$ are always of opposite sign relative to one another, and are combined through the resistors 92 and 98 as before indicated to produce the composite output voltage $Vo$.

Figure 4:
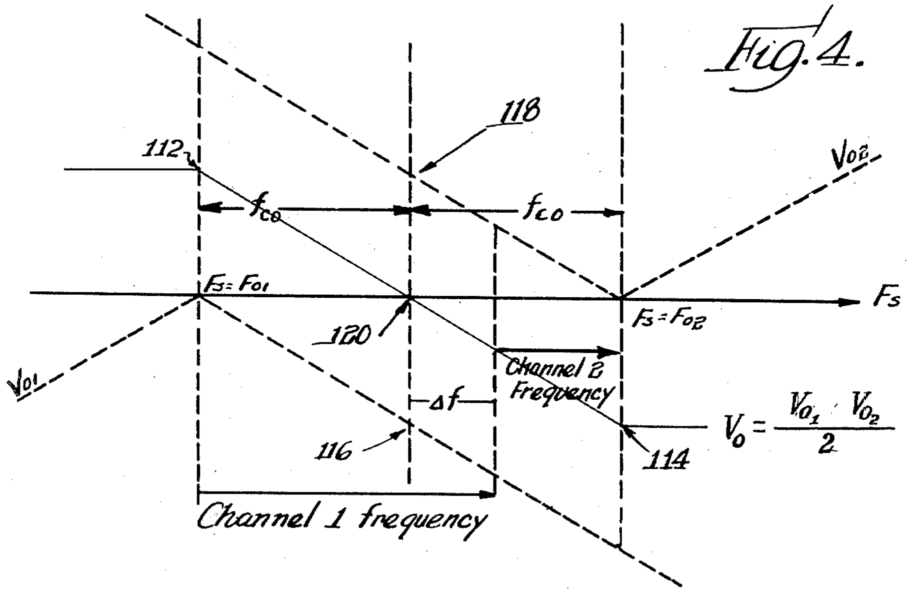
Fig. 4 illustrates the discriminator curve of our improved demodulator.

A discriminator curve of our double counter demodulator is shown in Fig. 4. The word "curve" is used in its broad sense as the output is very nearly perfectly linear. The curve is a plot of output voltage against input signal frequency. When the frequency of the input signal $Fs$ is equal to the frequency of the local oscillator 14, there is no beat frequency output signal from the mixer 10 and consequently the voltage $Vo1$ is equal to 0 as indicated at $Fs=Fo1$ along the horizontal axis. At the same time the input frequency signal $Fs$ will differ from that of the local oscillator 16 by a given amount which will engender a predetermined output voltage $Vo2$ as indicated at 112 in Fig. 4. When the input signal $Fs$ decreases above $Fo1$, a frequency equal to the difference between $Fo1$ and $Fs$ is produced which results in a negative voltage $Vo1$, the magnitude of which varies with the difference in frequencies as shown by the dashed line $Vo1$ running downwardly and to the left from $Fs=Fo1$ on the horizontal axis with constantly decreasing values of $Fs$. At the same time the difference in frequency between the input signal and the local oscillator 16 continues to increase as shown by the fragmentary dashed line extending upwardly and to the left from 112.

When the input signal frequency increases from $Fs=Fo1$ to $Fs=Fo2$, i. e. $Fo2>Fs>Fo1$, a beat frequency between $Fs$ and $Fo2$ results which engenders a constantly decreasing (in magnitude) positive voltage $Vo2$ as indicated between the point 112 and $Fs=Fo2$ on the horizontal axis of Fig. 4. Simultaneously a beat frequency results between $Fs$ and $Fo1$ which gives rise to a constantly increasing (in magnitude) negative voltage as indicated by the dashed line between $Fs=Fo1$ on the horizontal axis and the point 114.

When the input signal frequency increases to $Fs=Fo2$, there is no output beat frequency from the mixer 12 and consequently the output voltage $Vo2$ of the counter discriminator 20 is equal to 0 at $Fs=Fo2$ on the horizontal axis. At the same time, the beat frequency output from the mixer 10 is the same as the frequency output of the mixer 12 when $Fs=Fo1$. This produces a negative voltage $Vo1$ from the discriminator 18 at 114 equal to the positive voltage at 112. As the input signal frequency $Fs$ continues to increase the beat frequency from the mixer 10 continues to increase and the output voltage $Vo1$ becomes progressively more negative as indicated by the dashed line extending to the right and down from the point 114. The mixer 12 again begins to produce an output beat frequency which results in the constantly increasing positive voltage $Vo2$ as indicated by the dashed line rising to the right from $Fs=Fo2$. All of the voltage variations with frequencies are linear due to the clipping action of the clipping amplifiers and the variation in output voltage of the discriminators being dependent upon frequency only.

When the input signal frequency $Fs$ is half way between the frequencies of the local oscillators 14 and 16, the difference frequencies or beat frequencies are equal and the discriminator output voltages $Vo1$ and $Vo2$ are equal in magnitude but opposite in sign as indicated at 116 and 118 respectively, the frequency difference being *fco*. At this particular frequency value, the total output voltage $$Vo=\frac{Vo1+Vo2}{2}=0$$

is indicated at 120. As the input signal frequency $Fs$ varies instantaneously due to modulation, output voltage $Vo$ remains equal to one half the sum of the discriminator output voltages $Vo1$ and $Vo2$ and varies linearly with the frequency. For any instantaneous frequency deviation $\Delta F$, the frequency of one or the other of the amplifying and discriminating channels increases by a given amount while the frequency of the other amplifying channel and discriminator decreases by the same amount, the sum of the two channel frequencies always being equal to the difference in frequency between the two local oscillators.

We speak of the points 112 and 114 as being "peaks" relative to the composite discriminator output curve $Vo$ to stay in line with conventional terminology, although the points are not, strictly speaking, "peaks." As the discriminator output voltages $Vo1$ and $Vo2$ are linear between these points with no bends or inflections, due to the independence of amplitude of the discriminators, the composite output voltage $Vo$, which is equal to one half the sum of the discriminator output voltages $Vo1$ and $Vo2$, necessarily is linear between the peaks.

The peak separation depends only upon the difference between the frequencies of the local oscillators. The peak separation can be as large as desirable, limited only by the bandpass of broad band amplifiers in preceding stages and independent of the input frequency. Inasmuch as the output voltage $Vo$ already consists of two opposed voltages and therefore can be either positive or negative relative to ground, it is unnecessary to provide a stabilized D. C. reference voltage in opposition to the output voltage for automatic frequency control. The composite voltage output curve $Vo$ has only one value for any instantaneous deviation from the minimum value, as opposed to the double values of $Vo1$ and $Vo2$ about the frequencies $Fo1$ and $Fo2$, respectively. Accordingly, no images caused by demodulator characteristics alone are possible. Changes in consequence of effects of temperature, supply voltage change, aging, and other factors occur substantially equally in the two channels of amplification and discrimination, and consequently balance out.

Figure 5:
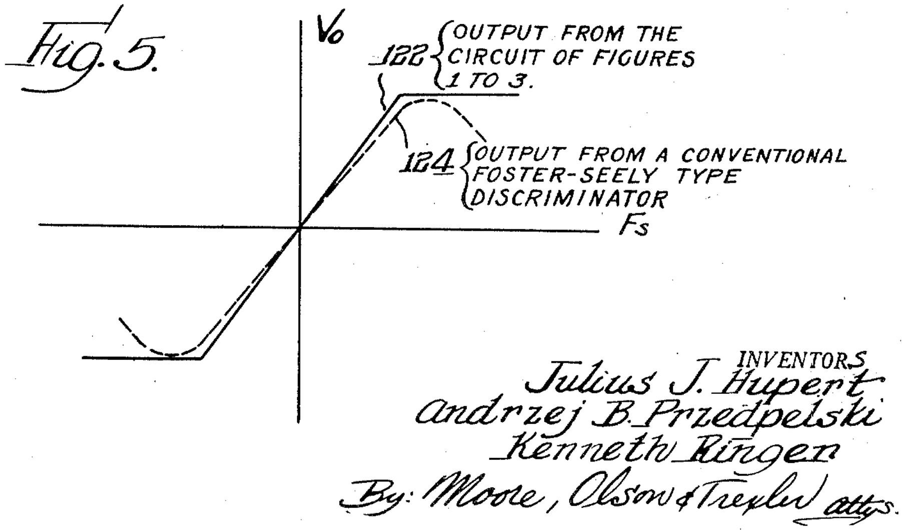
Fig. 5 illustrates the discriminator curve as compared with the discriminator curve of a conventional frequency modulation discriminator.

The linearity of the discriminator curve or composite voltage curve between peaks depends only on the band width of the broad band amplifiers, the time constant of the counter differentiating circuit, and on the quality of the squaring circuits or the clipping amplifiers. As a practical matter the discriminator curve can be made very nearly perfectly linear as indicated by the full line curve 122 shown in Fig. 5. A discriminator curve of the conventional Foster-Seely type of discriminator has been plotted at 124 dashed lines in Fig. 5 to illustrate the improved linearity of our double counter demodulator circuit.

It is to be understood that the particular circuits shown for carrying out our invention are for illustrative purposes only. The invention includes all that which falls within the spirit and scope of the appended claims.

We claim:

1. A frequency discriminator device for demodulating a signal frequency that is frequency modulated comprising means for generating a frequency lower than the signal frequency, means for mixing said lower frequency with the signal frequency to produce a first difference frequency, means for generating a frequency higher than the signal frequency, means for mixing said higher frequency with the signal frequency to produce a second difference frequency, a first counter discriminator for producing a voltage proportional to said first difference frequency, a second counter discriminator for producing a voltage proportional to said second difference frequency, said first counter discriminator including electronic means containing two cathodes and two plates, one of said cathodes and one of said plates being interconnected and having impressed thereon said first difference frequency, the other of said cathodes being grounded and the other of said plates being grounded through a resistance, a voltage proportional to said first difference frequency being developed at the junction between said other plate and said resistance, said second counter discriminator including a second electronic means containing a pair of plates and a pair of cathodes, one of the cathodes and plates of said second electronic means being interconnected and having impressed thereon said second difference frequency, the other plate of said second electronic means being grounded through a second resistance, a voltage proportional to said second difference frequency being developed at the junction of said other cathode of said second electronic means and said second resistor, and means for combining said voltages to produce a single voltage varying in accordance with the frequency modulation of the signal frequency.

2. A frequency discriminator device for demodulating a signal frequency that is frequency modulated comprising means for generating a frequency lower than the signal frequency, means for mixing said lower frequency with the signal frequency to produce a first difference frequency, means for generating a frequency higher than the signal frequency, means for mixing said higher frequency with the signal frequency to produce a second difference frequency, a first counter discriminator for producing a voltage proportional to said first difference frequency, a second counter discriminator for producing a voltage proportional to said second difference frequency, said first counter discriminator including electronic means containing two cathodes and two plates, one of said cathodes and one of said plates being interconnected and having impressed thereon said first difference frequency, the other of said cathodes being grounded and the other of said plates being grounded through a resistance, a voltage proportional to said first difference frequency being developed at the junction between said other plate and said resistance, said second counter discriminator including a second electronic means containing a pair of plates and a pair of cathodes, one of the cathodes and plates of said second electronic means being interconnected and having impressed thereon said second difference frequency, the other plate of said second electronic means being grounded through a second resistance, a voltage proportional to said second difference frequency being developed at the junction of said other cathode of said second electronic means and said second resistor, and an integrating circuit for combining said voltages including a pair of resistances connected at one end to each other and at the other end to said junctions, the point of connection between said pair of resistors being connected to ground through a capacitor, a combined output voltage being produced between the point of connection between said pair of resistors and ground.

3. A frequency discriminator device for modulating a signal frequency that is frequency modulated comprising means for generating frequency lower than the signal frequency, means for mixing said lower frequency with the signal frequency to produce a first difference frequency, means for generating a frequency higher than the signal frequency, means for mixing said higher frequency with the signal frequency to produce a second difference frequency, means for limiting the amplitude of said first difference frequency and means for limiting the amplitude of said second difference frequency, a first counter discriminator for producing a voltage proportional to said first limited difference frequency, a second counter discriminator for producing a voltage proportional to said second limited difference frequency, said first counter discriminator including electronic means containing two cathodes and two plates, one of said cathodes and one of said plates being interconnected and having impressed thereon said first difference frequency, the other of said cathodes being grounded and the other of said plates being grounded through a resistance, a voltage proportional to said first difference frequency being developed at the junction between said other plate and said resistance, said second counter between said other plate and said resistance, said second counter discriminator including a second electronic means containing a pair of plates and a pair of cathodes, one of the cathodes and plates of said second electronic means being interconnected and having impressed thereon said second difference frequency, the other plate of said second electronic means being grounded through a second resistance, a voltage proportional to said second difference frequency being developed at the junction of said other cathode of said second electronic means and said second resistor, and means for combining said voltages to produce a single voltage varying in accordance with the frequency modulation of the signal frequency.

4. A frequency discriminator device for modulating a signal frequency that is frequency modulated comprising means for generating frequency lower than the signal frequency, means for mixing said lower frequency with the signal frequency to produce a first difference frequency, means for generating a frequency higher than the signal frequency, means for mixing said higher frequency with the signal frequency to produce a second difference frequency, means for limiting the amplitude of said first difference frequency and means for limiting the amplitude of said second difference frequency, a first counter discriminator for producing a voltage proportional to said first limited difference frequency, a second counter discriminator for producing a voltage proportional to said second limited difference frequency, said first counter discriminator including electronic means containing two cathodes and two plates, one of said cathodes and one of said plates being interconnected and having impressed thereon said first difference frequency, the other of said cathodes being grounded and the other of said plates being grounded through a resistance, a voltage proportional to said first difference frequency being developed at the junction between said other plate and said resistance, said second counter discriminator including a second electronic means containing a pair of plates and a pair of cathodes, one of the cathodes and plates of said second electronic means being interconnected and having impressed thereon said second difference frequency, the other plate of said second electronic means being grounded through a second resistance, a voltage proportional to said second difference frequency being developed at the junction of said other cathode of said second electronic means and said second resistor, and means for combining said voltages to produce a single voltage varying in accordance with the frequency modulation of the signal frequency, and an integrating circuit for combining said voltages including a pair of resistances connected at one end to each other and at the other end to said junctions, the point of connection between said pair of resistors being connected to ground through a capacitor, a combined output voltage being produced between the point of connection between said pair of resistors and ground.

References Cited in the file of this patent

UNITED STATES PATENTS

| | | |
|---|---|---|
| 1,944,315 | Clapp | Jan. 23, 1934 |
| 2,425,981 | Bard | Aug. 19, 1947 |
| 2,480,799 | White | Aug. 30, 1949 |
| 2,491,922 | Hepp | Dec. 20, 1949 |
| 2,537,163 | Shenk et al. | Jan. 9, 1951 |
| 2,539,204 | Rambo | Jan. 23, 1951 |
| 2,587,755 | Packard et al. | Mar. 4, 1952 |